United States Patent
Kammer et al.

(10) Patent No.: US 7,944,067 B2
(45) Date of Patent: May 17, 2011

(54) SYSTEM AND METHOD FOR REDUCING ROTOR LOADS IN A WIND TURBINE UPON DETECTION OF BLADE-PITCH FAILURE AND LOSS OF COUNTER-TORQUE

(75) Inventors: Leonardo Cesar Kammer, Niskayuna, NY (US); Axel Braicks, Rheine (DE); Hubert Oing, Berlin (DE)

(73) Assignee: General Electric Company, Niskayuna, NY (US)

(*) Notice: Subject to any disclaimer, the term of this patent is extended or adjusted under 35 U.S.C. 154(b) by 476 days.

(21) Appl. No.: 12/060,833

(22) Filed: Apr. 1, 2008

(65) Prior Publication Data
US 2009/0243295 A1    Oct. 1, 2009

(51) Int. Cl.
*F03D 9/00*    (2006.01)
*H02P 9/04*    (2006.01)

(52) U.S. Cl. ........................................ 290/44
(58) Field of Classification Search ............... 290/44
See application file for complete search history.

(56) References Cited

U.S. PATENT DOCUMENTS

| | | | | |
|---|---|---|---|---|
| 3,876,334 A | | 4/1975 | Andrews | 416/160 |
| 4,449,053 A | * | 5/1984 | Kutcher | 290/44 |
| 4,462,753 A | | 7/1984 | Harner et al. | 416/48 |
| 4,490,093 A | * | 12/1984 | Chertok et al. | 416/26 |
| 4,514,145 A | * | 4/1985 | Wood | 416/170 R |
| 4,575,311 A | * | 3/1986 | Wood | 416/170 R |
| 4,613,282 A | * | 9/1986 | Wood | 416/36 |
| 4,659,284 A | * | 4/1987 | Wood | 416/36 |
| 4,664,596 A | * | 5/1987 | Wood | 416/32 |
| 5,278,773 A | * | 1/1994 | Cousineau | 700/287 |
| 5,422,826 A | * | 6/1995 | Cousineau | 700/287 |
| 5,570,859 A | * | 11/1996 | Quandt | 244/213 |
| 5,584,655 A | * | 12/1996 | Deering | 416/31 |
| 5,907,192 A | * | 5/1999 | Lyons et al. | 290/44 |
| 6,265,785 B1 | * | 7/2001 | Cousineau et al. | 290/44 |
| 7,015,595 B2 | | 3/2006 | Feddersen et al. | 290/44 |
| 7,173,399 B2 | * | 2/2007 | Sihler et al. | 322/40 |
| 7,218,012 B1 | * | 5/2007 | Edenfeld | 290/44 |
| 7,423,411 B2 | * | 9/2008 | Sihler | 322/19 |
| 7,488,155 B2 | * | 2/2009 | Barbu et al. | 416/1 |
| 7,508,089 B2 | * | 3/2009 | Guang et al. | 290/44 |
| 7,586,205 B2 | * | 9/2009 | Krueger | 290/44 |

(Continued)

FOREIGN PATENT DOCUMENTS

WO    2006/007838 A1    1/2006

(Continued)

*Primary Examiner* — T. C. Patel
*Assistant Examiner* — Pedro J Cuevas
(74) *Attorney, Agent, or Firm* — Ann M. Agosti

(57) ABSTRACT

A system and method for reducing rotor loads in a wind turbine that includes a brake and one or more rotor blades coupled to a rotor. Upon detection of a loss of counter torque and a blade-pitch failure in at least one rotor blade, a processor reduces a generator overspeed threshold value by a predetermined amount and determines a brake-release threshold value. The brake is applied to slow the rotor if the generator/rotor speed exceeds the reduced generator/rotor overspeed threshold value. In addition, the brake is applied to slow the rotor until the generator/rotor speed is below the brake-release threshold value. The rate of change of the pitch angle of the rotor blade may be varied as the blade moves toward feather in response to the detected blade-pitch failure.

22 Claims, 5 Drawing Sheets

U.S. PATENT DOCUMENTS

| | | | |
|---|---|---|---|
| 7,709,972 B2 * | 5/2010 | Arinaga et al. | 290/55 |
| 7,802,469 B2 * | 9/2010 | Staedler et al. | 73/170.01 |
| 7,834,472 B2 * | 11/2010 | Rebsdorf et al. | 290/44 |
| 2004/0094964 A1 * | 5/2004 | Mikhail et al. | 290/44 |
| 2006/0232250 A1 * | 10/2006 | Sihler et al. | 322/58 |
| 2007/0116572 A1 | 5/2007 | Barbu et al. | |
| 2007/0189900 A1 * | 8/2007 | Rogall et al. | 416/132 B |
| 2007/0279012 A1 * | 12/2007 | Sihler | 322/20 |
| 2008/0084068 A1 * | 4/2008 | Shibata et al. | 290/44 |
| 2008/0136188 A1 * | 6/2008 | Krueger | 290/44 |
| 2008/0304965 A1 * | 12/2008 | Syrovy | 416/117 |
| 2009/0058086 A1 * | 3/2009 | Arinaga et al. | 290/44 |
| 2010/0038191 A1 * | 2/2010 | Culbertson et al. | 188/72.6 |
| 2010/0038192 A1 * | 2/2010 | Culbertson | 188/73.31 |
| 2010/0079019 A1 * | 4/2010 | Buskirk et al. | 310/77 |
| 2010/0123314 A1 * | 5/2010 | Menke | 290/44 |
| 2010/0133823 A1 * | 6/2010 | Schramm et al. | 290/44 |
| 2010/0258390 A1 * | 10/2010 | Culbertson | 188/156 |
| 2010/0314873 A1 * | 12/2010 | Stone | 290/44 |
| 2010/0314881 A1 * | 12/2010 | Stone | 290/55 |
| 2011/0002772 A1 * | 1/2011 | Colling | 415/1 |

FOREIGN PATENT DOCUMENTS

WO    WO 2006007838 A1 * 1/2006

* cited by examiner

| SENSOR | BASELINE | EARLY BRAKE | SLOW PITCH | EARLY BRAKE + SLOW PITCH |
|---|---|---|---|---|
| RESULTANT MOMENT AT HUB CENTER | 100% | 84.6% | 79.4% | 75.3% |
| RESULTANT AT HUB FLANGE | 100% | 84.9% | 78.7% | 70.6% |
| YAWING MOMENT AT YAW BEARING | 100% | 84.6% | 76.2% | 72.4% |
| NODDING AT YAW BEARING | 100% | 87.8% | 80.8% | 73.5% |
| RESULTANT AT YAW BEARING | 100% | 87.1% | 83.3% | 73.5% |
| TORSION AT TOWER BASE | 100% | 84.6% | 76.2% | 72.3% |

FIG.6

SYSTEM AND METHOD FOR REDUCING ROTOR LOADS IN A WIND TURBINE UPON DETECTION OF BLADE-PITCH FAILURE AND LOSS OF COUNTER-TORQUE

BACKGROUND

This invention relates generally to wind turbines, and more particularly to methods and apparatus for efficiently reducing rotor loads in a wind turbine upon detection of a blade-pitch failure and loss of counter-torque, for example, a grid anomaly.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 80 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is fed into a utility grid. Some turbines utilize generators that are directly coupled to the rotor without using a gearbox.

A backup power source, such as a battery, is provided in the rotor blade adjustment system and is directly applied to the blade adjustment drive when the power grid fails, thereby assuring power at all times to the blade adjusting drive. If an emergency shut down is triggered, which usually requires auxiliary-powered blade pitching, all blades start pitching towards feather with the same fast pitch rate.

At least some known wind turbines may include redundant braking systems to satisfy safety requirements. For example, at least some known wind turbines include a disk brake to facilitate stopping a wind turbine rotor against full wind torque, and a stored energy source, such as hydraulic accumulators, stored spring energy, capacitors, and/or batteries, to enable braking during a power failure.

One of the most severe situations for a wind turbine is a combination of the loss of counter-torque provided by the generator, for example, loss of grid connection, and the failure of one of the blades to pitch towards feather. The pitch failure causes blade asymmetry and the loss of counter-torque causes high rotor speed. The combination of these two conditions causes a large aerodynamic imbalance in the rotor that may cause very high loads in many components in the wind turbine, particularly in the tower top (e.g., hub, main bearing, main frame, and the like). Thus, there is a need to minimize the effect of these very high loads on wind turbine components during detection of blade-pitch failure in association with the loss of counter-torque.

SUMMARY OF THE INVENTION

Briefly, a method for braking a wind turbine including a brake and at least one rotor blade coupled to a rotor, the method comprising the steps of:
detecting a loss of counter torque;
controlling a pitch angle of the at least one rotor blade in response to the detected loss of counter torque;
detecting a blade-pitch failure in the at least one rotor blade; and
applying the brake to slow the rotor.

In another aspect of the invention, a method for braking a wind turbine including at least two rotor blades coupled to a rotor, the method comprising the steps of
detecting a loss of counter torque;
controlling a pitch angle of the at least two rotor blades in response to the detected loss of counter torque;
detecting a blade-pitch failure in at least one of the rotor blades; and
varying a rate of change of pitch angle of all functioning rotor blades in response to the detected blade-pitch failure in at least one of the rotor blades.

In yet another aspect of the invention, a wind turbine system configured to couple to a power grid comprises a rotor comprising at least one rotor blade; a brake coupled to the rotor; a blade pitch actuator; and a processor coupled to the blade pitch actuator, wherein the processor is configured to detect a grid anomaly in the power grid and a blade-pitch failure in the at least one rotor blade.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a table of extreme loads at various locations of the wind turbine under the scenario of a grid loss combined with one-blade-pitch failure and highlights the benefits of the strategies of the invention in comparison to a conventional (baseline) strategy.

DETAILED DESCRIPTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
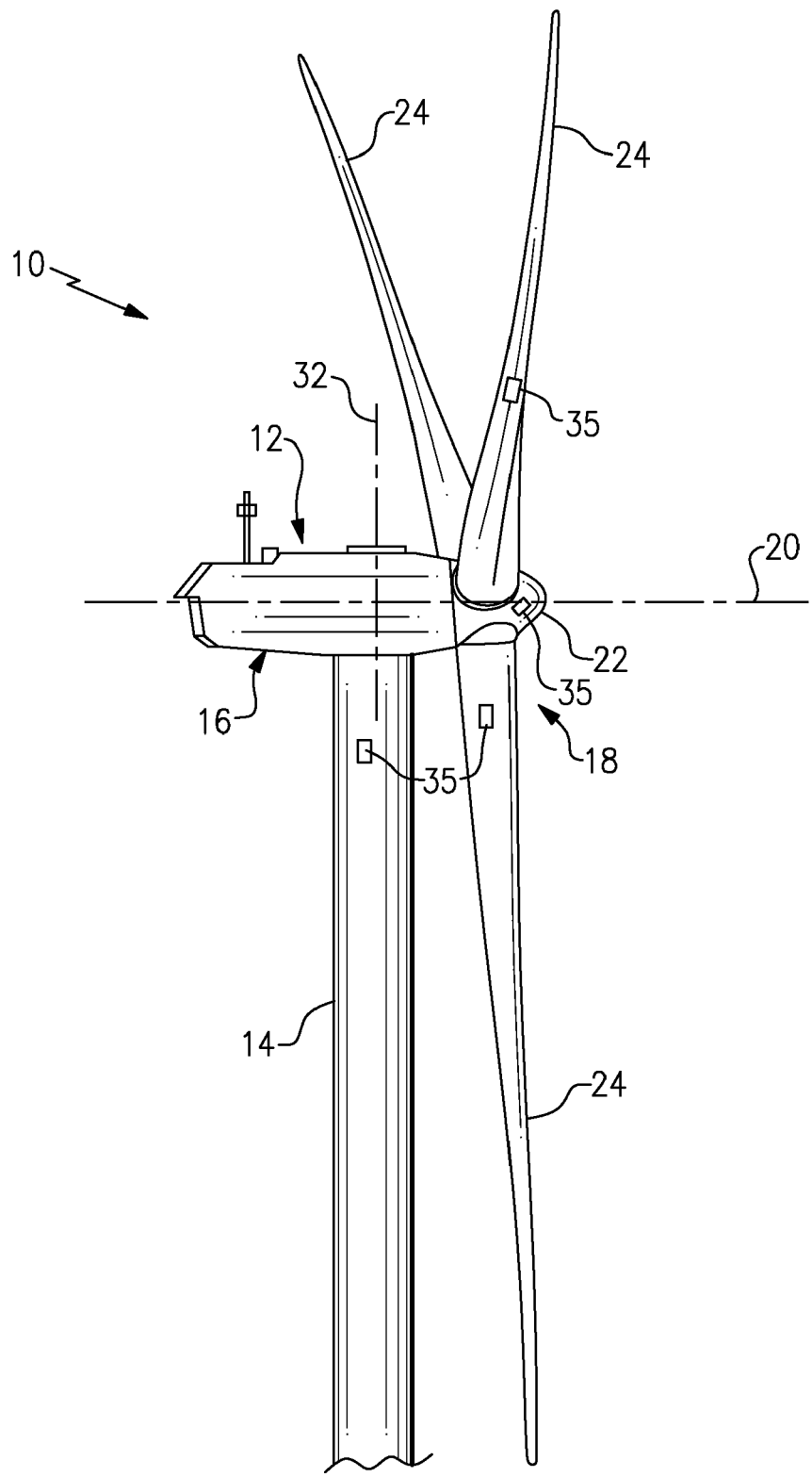
FIG. 1 is a perspective view of an exemplary embodiment of an exemplary wind turbine.
Figure 2:
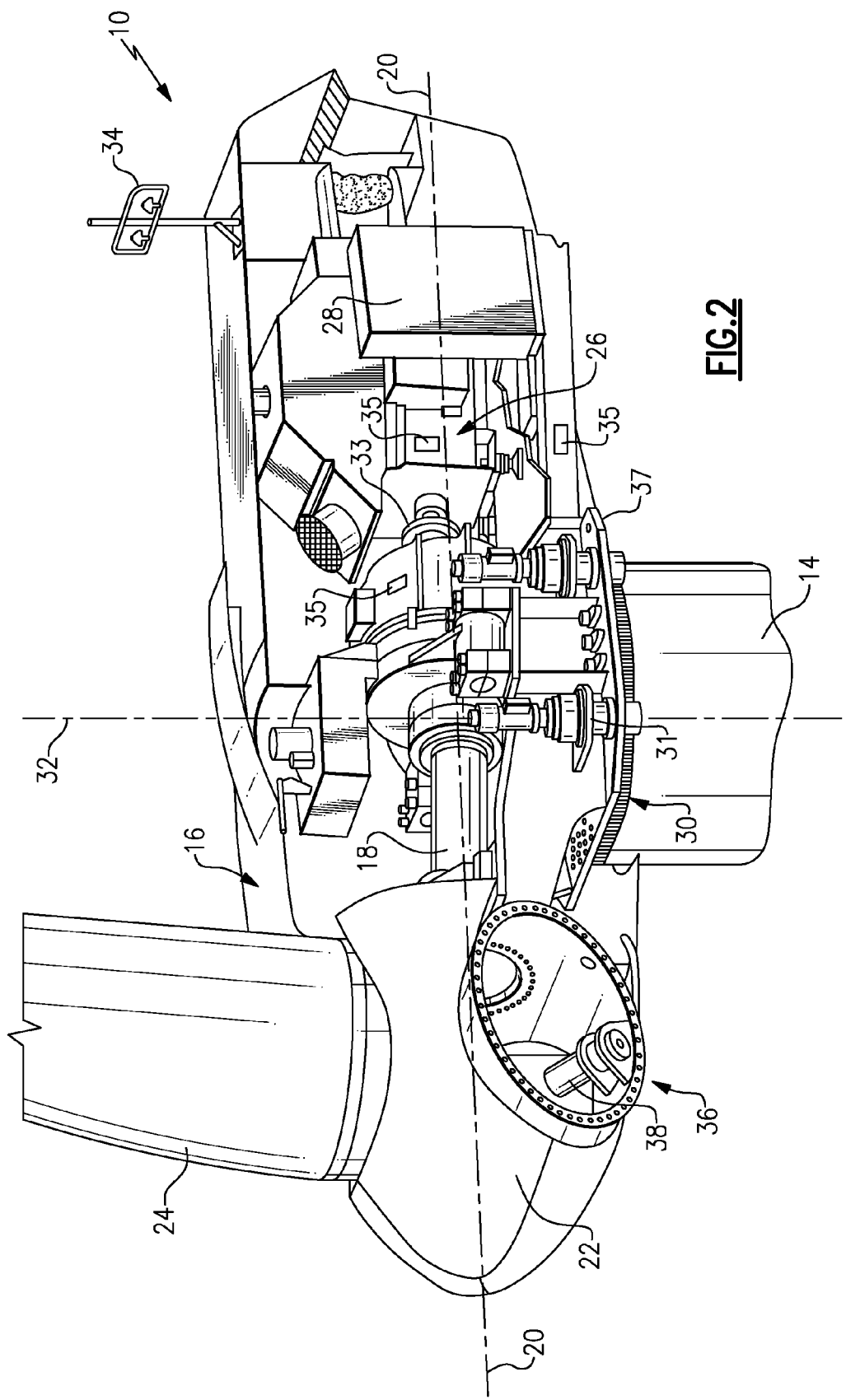
FIG. 2 is a partially cut-away perspective view of a portion of the wind turbine shown in FIG. 1.

FIG. 1 is a perspective of an exemplary embodiment of an exemplary wind turbine 10. FIG. 2 is a partially cut-away perspective view of a portion of wind turbine 10. Wind turbine 10 described and illustrated herein includes a wind generator 12 for generating electrical power from wind energy. However, in some embodiments, wind turbine 10 may include, in addition or alternative to wind generator 12, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1 and 2, in some embodiments a plurality of wind turbines 10 may be grouped together, sometimes referred to as a "wind farm."

In some embodiments, wind generator 12 is mounted on a tower 14, however, in some embodiments wind turbine 10 includes, in addition or alternative to tower-mounted wind generator 12, a wind generator (and/or other type of wind turbine) adjacent the ground and/or a surface of water. The height of tower 14 may be selected based upon factors and conditions known in the art. Wind generator 12 includes a body 16, sometimes referred to as a "nacelle", and a rotor (generally designated by 18) coupled to body 16 for rotation with respect to body 16 about an axis of rotation 20. Rotor 18 includes a hub 22 and a plurality of blades 24 (sometimes referred to as "airfoils") extending radially outwardly from hub 22 for converting wind energy into rotational energy. Although rotor 18 is described and illustrated herein as having three blades 24, rotor 18 may have any number of blades 24. Blades 24 may each have any length (whether described herein). For example, in some embodiments one or more rotor blades 24 are about 0.5 meters long, while in some embodiments one or more rotor blades 24 are about 50 meters long. Other examples of blade 24 lengths include 10 meters or less, about 20 meters, about 37 meters, and about 40 meters. Still other examples include rotor blades between about 50 and about 100 meters long.

Despite how rotor blades 24 are illustrated in FIG. 1, rotor 18 may have blades 24 of any shape, and may have blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Another example of another type, shape, and/or configuration of rotor blades 24 is a darrieus wind turbine, sometimes referred to as an "eggbeater" turbine. Yet another example of another type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Wind generator 12 includes an electrical generator 26 coupled to rotor 18 for generating electrical power from the rotational energy generated by rotor 18. Generator 26 may be any suitable type of electrical generator, such as, but not limited to, a wound rotor induction generator. General operation of the electrical generator to generate electrical power from the rotational energy of rotor 18 is known in the art and therefore will not be described in more detail herein. In some embodiments, wind turbine 10 may include one or more control systems 28 coupled to some or all of the components of wind generator 12 for generally controlling operation of wind generator 12 and/or as some or all of the components thereof (whether such components are described and/or illustrated herein). In the exemplary embodiment, control system (s) 28 is mounted on wind generator 12. However, additionally or alternatively, one or more control systems 28 may be remote from wind generator 12 and/or other components of wind turbine 10. Control system(s) 28 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind generator 12 may include a brake 33, for example, a hydraulic parking brake, an electro-mechanical brake, a centrifugal brake, an Eddie-current brake (retarder), or a magnetic brake, for braking rotation of rotor 18 to, for example, slow rotation of rotor 18, brake rotor 18 against full wind torque, and/or reduce the generation of electrical power from electrical generator 26. Furthermore, in some embodiments, wind generator 12 may include a yaw system 30 for rotating wind generator 12 about an axis of rotation 32 for changing a yaw of rotor 18, and more specifically for changing a direction faced by rotor 18 to, for example, adjust an angle between the direction faced by rotor 18 and a direction of wind. In the illustrated embodiment, the yaw system 30 includes a yaw drive 31 and a yaw deck 37. Yaw system 30 may be coupled to control system(s) 28 for control thereby. In some embodiments, the wind generator 12 may include an anemometer 34 for measuring wind speed and/or wind direction. Anemometer 34, in some embodiments, may be coupled to control system(s) 28 for sending measurements to control system(s) 28 for processing thereof. For example, and although anemometer 34 may be coupled to control system(s) 28 for sending measurements thereto for controlling other operations of wind turbine 10, anemometer 34 may send measurements to control system(s) 28 for controlling and/or changing a yaw of rotor 18 using yaw system 30. Alternatively, anemometer 34 may be coupled directly to yaw system 30 for controlling and/or changing a yaw of rotor 18. Wind turbine 10 may also include one or more other sensors 35 coupled to one or more components of wind farm 10 and/or the power grid, whether such component(s) are described or illustrated herein, for measuring parameters of such component(s). Sensor(s) 35 may include, but are not limited to, sensors configured to measure displacements, yaw, pitch, moments, strain, stress, twist, damage, failure, rotor torque, rotor speed, a grid anomaly in the power grid, and/or an anomaly of power supplied to any component of wind turbine 10. Although exemplary sensors 35 are illustrated herein as coupled to various components of wind turbine 10, for example tower 14, blades 24 and hub 22, the sensors 35 illustrated herein are not limited to the components each sensor is shown as coupled to, nor the location shown on such components. Rather, sensor(s) 35 may couple to any component of wind turbine 10 and/or the power grid at any location thereof for measuring any parameter thereof, whether such component, location, and/or parameter is described and/or illustrated herein. General operation of wind turbine 10, and more specifically wind generator 12, is known in the art and therefore will not be described in more detail herein.

Wind generator 12 includes a variable blade pitch system 36 for selectively controlling, including but not limited to changing, a pitch angle of rotor blades 24. Pitch system 36 may be coupled to control system(s) 28 for control thereby. In the illustrated embodiment, hub 22 receives three blades 24, but other configurations can utilize any number of blades. In some embodiments, the pitch angles of blades 24 are individually controlled by pitch system 36. Pitch system 36 includes one or more actuators 38 coupled to hub 22 and blades 24 for changing the pitch angle of blades 24 by rotating blades 24 with respect to hub 22. Actuators 38 may include any suitable structure, configuration, arrangement, means, and/or components, whether described and/or illustrated herein, such as, but not limited to, electrical motors, hydraulic cylinders, springs, and/or servo-mechanisms. Moreover, actuators 38 may be driven by any suitable means, whether described and/or illustrated herein, such as, but not limited to, hydraulic fluid, electrical power, electro-chemical power, and/or mechanical power, such as, but not limited to, spring force. Additionally or alternatively, actuators 38 may be driven by energy extracted from rotational inertia of rotor 18 and/or a stored energy source (not shown) that supplies components of wind turbine 10, such as, but not limited to, control system(s) 28 and/or pitch system 36, energy during a grid anomaly in the power grid coupled to wind turbine 10. For example, a grid anomaly in the utility power grid may include, but is not limited to, a power failure, an undervoltage condition, an overvoltage condition, and/or an out-of-frequency condition. As such, the stored energy source enables pitching of blades 24 during the grid anomaly. Although other stored energy sources may be used, in some embodiments the stored energy source includes hydraulic accumulators, electrical generators, stored spring energy, capacitors, and/or batteries. The stored energy sources may be located anywhere within, on, adjacent to, and/or remote from wind turbine 10. In some embodiments, the stored energy source stores energy extracted from rotational inertia of rotor 18, energy stored within a converter (not shown) of wind turbine 10, and/or other auxiliary energy sources such as, but not limited to, an auxiliary wind turbine (not shown) coupled to wind turbine 20, solar panels, and/or hydro-power installations.

In case of loss of grid power, it would be desirable to be able to control the pitch of blades 24 to assist with braking during shutdown. In this case, there may not be power available to operate the variable blade pitch system 36. Therefore, it is desirable that a backup source of energy (not shown) is provided in the rotor 18 to provide emergency backup power for the variable blade pitch system 36. Battery packs or other sources of backup energy (not shown) may be provided in the hub 22 to provide backup power to the variable blade pitch system 36 for each of the blades 24.

Figure 3:
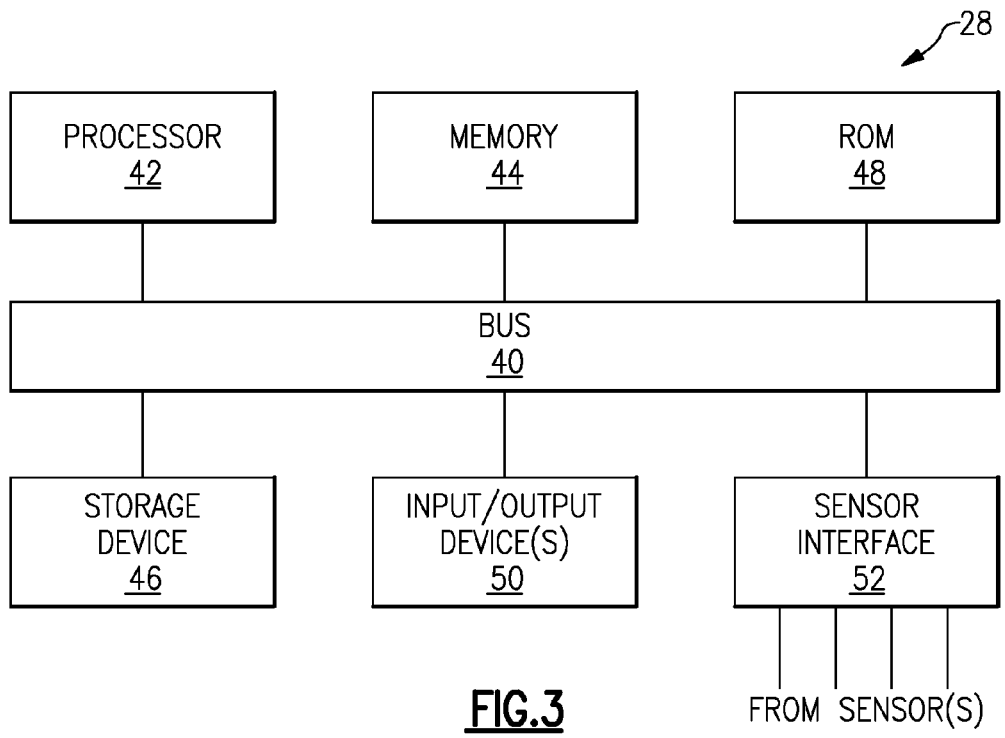
FIG. 3 is a block diagram of an exemplary embodiment of a control system for the wind turbine shown in FIGS. 1 and 2.

FIG. 3 is a block diagram of an exemplary embodiment of control system(s) 28. In some embodiments, control system(s) 28 include a bus 40 or other communications device to communicate information. One or more processor(s) 42 are coupled to bus 40 to process information, including information from anemometer 34 and/or sensors 35. Control system(s) 28 may also include one or more random access memories (RAM) 44 and/or other storage device(s) 46. RAM(s) 44 and storage device(s) 46 are coupled to bus 40 to store and transfer information and instructions to be executed by processor(s) 42. RAM(s) 44 (and/or also storage device(s) 46, if included) can also be used to store temporary variables or other intermediate information during execution of instructions by processor(s) 42. Control system(s) 28 may also include one or more read only memories (ROM) 48 and/or other static storage devices coupled to bus 40 to store and provide static (i.e., non-changing) information and instructions to processor(s) 42. Input/output device(s) 50 may include any device known in the art to provide input data to control system(s) 28 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system(s) 28 may also include a sensor interface 52 that allows control system(s) 28 to communicate with anemometer 34 and/or sensors 35. Sensor interface 52 can be or can include, for example, one or more analog-to-digital converters that convert analog signals into digital signals that can be used by processor(s) 48.

Figure 4:
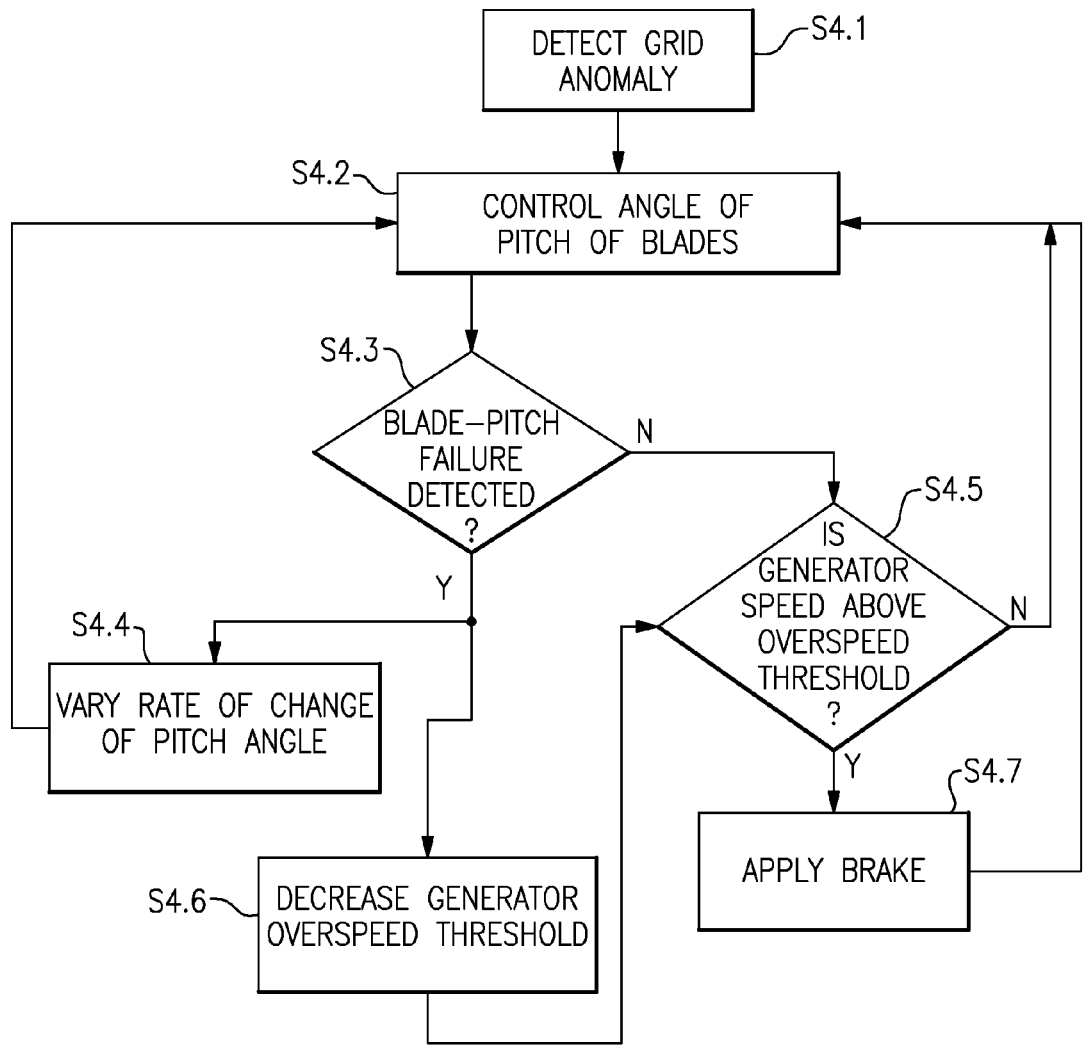
FIG. 4 is a flowchart illustrating an exemplary embodiment of a method for braking the wind turbine shown in FIGS. 1 and 2.

FIG. 4 is a flowchart illustrating an exemplary embodiment of a method for braking wind turbine 10 during detection of a loss of counter-torque, such as a grid anomaly in Step S4.1. Once this condition exists, the method includes selectively controlling an angle of pitch of one or more rotor blades 24 for example, using control system(s) 28 and/or pitch system 36 in Step S4.2. For example, selectively controlling the pitch angle of blade(s) 24 may include, but is not limited to, selecting the angle of pitch of blade(s) 24, changing the pitch angle of blade(s) 24, and/or controlling a rate at which the pitch angle of blade(s) 24 is changed. Some pitch angles and/or changes of pitch angle may induce vibrational stresses and/or other forces into components of wind turbine 10 (whether such components are described and/or illustrated herein), possibly resulting in damage to and/or failure of such components. For example, some pitch angles and/or changes of pitch angle may generate an imbalance of pitch angles between blades 24 that may damage and/or cause blades 24 and/or other components of wind turbine 10 to fail. Another example includes bending moments in tower 14 that damage tower 14 and/or cause tower 14 to fail caused by some pitch angles and/or changes of pitch angle. Moreover, some pitch angles and/or changes of pitch angle may induce loads that cause damage to and/or failure of components of wind turbine 10 such as, but not limited to, blades 24, hub 22, an interconnection between tower 14 and wind generator 12, a bedplate (not shown) of tower 14, a foundation (not shown) of wind turbine 10, a gearbox of wind turbine 10, a bearing of wind turbine 10, and/or a drivetrain of wind turbine 10.

In some embodiments, controlling the pitch angle of blade(s) 24 includes changing the pitch angle of blade(s) 24. In some embodiments, the pitch angle of blade(s) 24 is changed to aerodynamically brake the rotor 18. More specifically, blade(s) 24 are changed from a first position that is angled with respect to a wind direction such that wind drives rotation of rotor 18, to a second position, sometimes referred to as a "feathered position," that is angled with respect to the wind direction such that wind slows rotation of rotor 18. Accordingly, changing the pitch angle of rotor blade(s) 24 from the first position to the second position facilitates aerodynamically braking the rotor 18. Although the first position may include other pitch angles, in some embodiments, blade(s) 24 are angled with respect to a wind direction at between about −5 degrees and about +5 degrees. Moreover, although the second position may include other pitch angles, in some embodiments, blade(s) 24 are angled with respect to a wind direction at between about 85 degrees and about 95 degrees. In some embodiments, and for example, when control system (s) 28 detects a grid anomaly in the power grid, control system (s) 28 may command pitch system 36 to change a pitch angle of rotor blade(s) 24 to thereby aerodynamically brake the rotor 18 in response to the grid anomaly. In the event of a grid anomaly, energy may be extracted from the stored energy source and supplied to control system(s) 28 and/or pitch system 36 for operation thereof.

Next, the method determines whether a blade-pitch failure has been detected in Step S4.3. A blade-pitch failure occurs when the control of the pitch angle of one or more blades 24 fails. This can be accomplished by one of the sensors 35 on pitch system 36 sending a signal indicating to the control system(s) 28 that the pitch angle of one or more blades 24 has remained constant as the blade 24 moves from the first position to the second, feathered position in Step S4.2. If a blade-pitch failure is detected, then the method may proceed with one of two options or both. The first option is to vary a rate of change of the pitch angle of rotor blade(s) 24 in Step S4.4 to further facilitate reducing or eliminating vibrational stresses and/or other forces induced into one or more components of wind turbine 10. For example, in some embodiments the rate of change of the pitch angle of blade(s) 24 is varied as blade(s) 24 are moved between the first position and the second position to aerodynamically brake rotor 18. The variance in the rate of change, including but not limited to the time for each particular rate of change, may be based, at least in part, on a design parameter of one or more components of wind turbine 10 and/or the power grid, and/or based, at least in part, on a parameter of one or more components of wind turbine 10 and/or the power grid measured by anemometer 34 and/or one or more of sensors 35. Accordingly, the variance in the rate of change, including but not limited to the time for each particular rate of change, may be selected to facilitate reducing or eliminating vibrational stresses and/or other forces induced into one or more predetermined components of wind turbine 10. For example, the variance in the rate of change may facilitate reducing and/or eliminating blade pitch imbalance and/or effect thereof.

Figure 5:
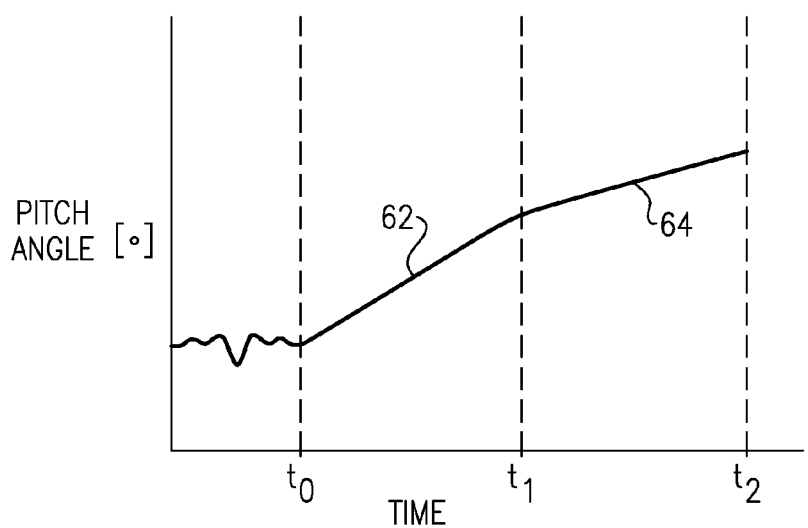
FIG. 5 is a graph illustrating an example of a portion of the method shown in FIG. 4.

FIG. 5 is a graph illustrating one example of varying the rate of change of the pitch angle of blade(s) 24 in Step S4.4. In the exemplary embodiment of FIG. 5, blade(s) 24 are pitched from a first position to the second position to aerodynamically brake the rotor 18. As blade(s) 24 are pitched from the first position to the second position, the pitch angle is changed at a first rate 62 and is thereafter changed at a second rate 64 that is less than first rate 62. More specifically, and for example, when control system(s) 28 detects a grid anomaly in the utility grid at about time to, control system(s) 28 command pitch system 36 to move the pitch angle of one or more blade(s) 24 from the first position toward the second position at first rate 62. After a pre-determined time period, or once rotation of rotor 18 has been slowed by a predetermined amount, control system(s) 28 command pitch system 36 at time $t_1$ to move the pitch angle of blade(s) 24 at second rate 64 until blade(s) 24 are in the second position at $t_2$. In some embodiments, first rate 62 facilitates reducing a speed and/or torque of rotor 18 as quickly as possible, while reduced second rate 64 facilitates reducing or eliminating vibrational stresses and/or other forces induced into one or more components of wind turbine 10. For example, second rate 64 may facilitate damping oscillation of tower 14.

Referring back to FIG. 4, the second option if a blade-pitch failure has been detected in Step S4.3 is to reduce or decrease the generator overspeed threshold value by a predetermined amount in Step S4.6. For example, the control system(s) 28 may decrease the generator overspeed threshold value by about 10% to about 25%. Alternatively, the method of the invention can reduce or decrease a rotor speed threshold value by a predetermined amount, rather than the generator overspeed threshold value.

It will be appreciated that the method can perform both Steps S4.4 and 4.6. That is, the method of the invention can both vary the rate of change of the pitch angle in Step S4.4, and decrease the generator overspeed threshold value in Step S4.6.

Next, the method determines whether the generator/rotor speed is above the decreased generator/rotor overspeed threshold value in Step S4.5. If not, then the method returns to Step S4.2, and the blades 24 continue to pitch to the feathered position. However, if the generator/rotor speed is above the decreased generator/rotor overspeed threshold value, then the brake 33 is applied to further slow the rotation of rotor 18 in Step S4.7. The method continues to apply the brake 33 until the generator speed is below a brake-release threshold value, which is a much lower value than the decreased generator overspeed threshold value. For example, the brake-release threshold value may be about 33% of the nominal generator speed. Once the rotor 18 is slowed and the generator speed is below the brake-release threshold value, the method no longer applies the brake 33, the method returns to Step S4.2, and the blades 24 continue to pitch to the feathered position.

FIG. 6 is a table illustrating the simulated load measurements from various locations of sensors 35 that usually benefit from the strategies described in this document. The first column 66 contains extreme values observed during simulations under baseline (traditional) strategies for turbine shutdown in the grid-loss combined with one-blade-pitch-failure scenario. All values are normalized such that baseline represents 100%. The second column 68 contains extreme load measurements from sensor(s) 35 as a result of applying the brake 33 immediately after detection of a pitch failure. For example, sensor 35 located at the center of hub 22 measured an extreme load of about 84.6% of baseline value as a result of applying the brake 33 earlier than the baseline strategy. The third column 70 contains extreme load measurements from sensor(s) 35 as a result of only varying the rate of change of blade pitch of blades 24 from the first rate 62 to the second rate 64 due to the detection of a pitch failure. For example, sensor 35 located at the center of hub 22 measured an extreme load of about 79.4% of baseline level as a result of varying the rate of change of blade pitch. The fourth column 72 contains extreme load measurement from sensor(s) 35 as a result of applying the brake 33 and varying the rate of change of blade pitch of blades 24 from the first rate 62 to the second rate 64. For example, sensor 35 located at the center of hub 22 measured an extreme load of about 75.3% of baseline level, which is lower than the load measurements from applying only the brake 33 and only varying the rate of change of blade pitch.

The above-described and/or illustrated methods and systems are cost-effective and efficient for braking wind turbines. More specifically, by varying a rate of change of the pitch angle of the rotor blade(s) during braking of the wind turbine rotor and selectively applying the brake on the wind turbine when a blade-pitch failure is detected, the methods and systems described and/or illustrated herein facilitate reducing forces induced into the wind turbine component(s). Accordingly, the methods and systems described and/or illustrated herein may facilitate reducing damage to and/or failure of wind turbine component(s) while still facilitating efficient braking of the wind turbine rotor. As such, a technical effect of the methods and systems described and/or illustrated herein may include facilitating reducing or eliminating forces induced into the wind turbine component(s) to facilitate reducing damage to and/or failure of the wind turbine component(s) while still facilitating efficient braking of the wind turbine rotor.

Although the systems and methods described and/or illustrated herein are described and/or illustrated with respect to a wind turbine, and more specifically braking a wind generator rotor, practice of the systems and methods described and/or illustrated herein is not limited to wind generators, nor wind turbines generally. Rather, the systems and methods described and/or illustrated herein are applicable to braking any rotor having one or more blades.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for braking a wind turbine including a brake and at least one rotor blade coupled to a rotor, the method comprising the steps of:
   detecting a loss of counter torque on the rotor;
   controlling a pitch angle of the at least one rotor blade in response to the detected loss of counter torque on the rotor;
   detecting a blade-pitch failure in the at least one rotor blade;
   determining a reduced generator overspeed threshold value in response to the blade-pitch failure;
   determining whether a generator speed exceeds the reduced generator overspeed threshold value; and
   applying the brake to slow the rotor in response to the loss of counter torque on the rotor and the blade-pitch failure when the generator speed exceeds the reduced generator overspeed threshold value.

2. A method according to claim 1, wherein the brake is applied when a rotor speed is above a reduced rotor speed threshold value.

3. A method according to claim 1, wherein the wind turbine is coupled to a utility power grid, and wherein the loss of counter-torque comprises a grid anomaly in the utility power grid.

4. A method according to claim 3, wherein the grid anomaly in the utility power grid comprises sensing at least one of an undervoltage condition, an overvoltage condition, and an out-of-frequency condition.

5. A method according to claim 1, wherein the brake comprises a hydraulic parking brake, an electromechanical brake, a centrifugal brake, an Eddie-current brake (retarder), or a magnetic brake.

6. A method for braking a wind turbine including at least two rotor blades coupled to a rotor, the method comprising the steps of:
   detecting a loss of counter torque on the rotor;
   controlling a pitch angle of the at least two rotor blades in response to the detected loss of counter torque on the rotor;
   detecting a blade-pitch failure in at least one of the rotor blades; and
   varying a rate of change of pitch angle of all functioning rotor blades in response to the loss of counter torque on the rotor and the blade-pitch failure in at least one of the rotor blades.

7. A method according to claim 6, wherein varying the rate of change of pitch angle of all functioning rotor blades comprises changing the pitch angle at a first rate and thereafter changing the pitch angle at a second rate that is different from the first rate.

8. A method according to claim 6, wherein varying the rate of change of pitch angle of all functioning rotor blades comprises varying the rate of change of the pitch angle based on at least one of a design parameter of a component of the wind turbine and a measured parameter of a component of the wind turbine.

9. A method according to claim 6, wherein the wind turbine also includes a brake, and wherein the method further comprises the step of applying the brake to slow the rotor.

10. A method according to claim 9, wherein the brake comprises a hydraulic parking brake, an electromechanical brake, a centrifugal brake, an Eddie-current brake (retarder), or a magnetic brake.

11. A method according to claim 6, wherein the wind turbine is coupled to a utility power grid, and wherein the loss of counter-torque comprises a grid anomaly in the utility power grid.

12. A wind turbine system configured to be coupled to a power grid, comprising:
   a rotor comprising at least one rotor blade;
   a brake coupled to the rotor;
   a blade pitch actuator; and
   a processor coupled to the blade pitch actuator, wherein the processor is configured to detect a loss of counter torque on the rotor and a blade-pitch failure in the at least one rotor blade, and wherein the processor determines a decreased generator overspeed threshold value in response to the blade-pitch failure, and whether a generator speed exceeds the decreased generator overspeed threshold value, and
   wherein the processor applies the brake to slow the rotor in response to the loss of counter torque on the rotor and the blade-pitch failure when the generator speed exceeds the decreased generator overspeed threshold value.

13. A wind turbine system according to claim 12, wherein the brake is applied when a rotor speed is above a reduced rotor speed threshold value.

14. A wind turbine system according to claim 12, wherein the wind turbine comprises at least two rotor blades, and wherein the processor varies a rate of change of pitch angle of all functioning blades in response to the detected blade-pitch failure.

15. A wind turbine system according to claim 14, wherein the processor is configured to vary the rate of change of pitch angle of all functioning blades at a first rate and thereafter change the pitch angle at a second rate that is different than the first rate.

16. A wind turbine system according to claim 12, wherein the brake comprises a hydraulic parking brake, an electromechanical brake, a centrifugal brake, an Eddie-current brake (retarder), or a magnetic brake.

17. A wind turbine system configured to be coupled to a power grid, comprising:
   a rotor comprising at least two rotor blades;
   a blade pitch actuator; and
   a processor coupled to the blade pitch actuator, wherein the processor is configured to detect a loss of counter torque on the rotor and a blade-pitch failure in one of the at least two rotor blades,
   wherein the processor varies a rate of change of pitch angle of all functioning blades in response to the loss of counter torque on the rotor and the blade-pitch failure in one of the at least two rotor blades.

18. A wind turbine system according to claim 17, wherein the processor is configured to vary the rate of change of pitch angle of all functioning blades at a first rate and thereafter change the pitch angle at a second rate that is different than the first rate.

19. A wind turbine system according to claim 17, further comprising a brake coupled to the rotor.

20. A wind turbine system according to claim 19, wherein the brake is applied when a generator speed is above a reduced generator overspeed threshold value.

21. A wind turbine system according to claim 19, wherein the brake is applied when a rotor speed is above a reduced rotor speed threshold value.

22. A wind turbine system according to claim 19, wherein the brake comprises a hydraulic parking brake, an electromechanical brake, a centrifugal brake, an Eddie-current brake (retarder), or a magnetic brake.

* * * * *